May 11, 1937. H. W. PRICE 2,079,871
OUTBOARD MOTOR
Filed July 3, 1935
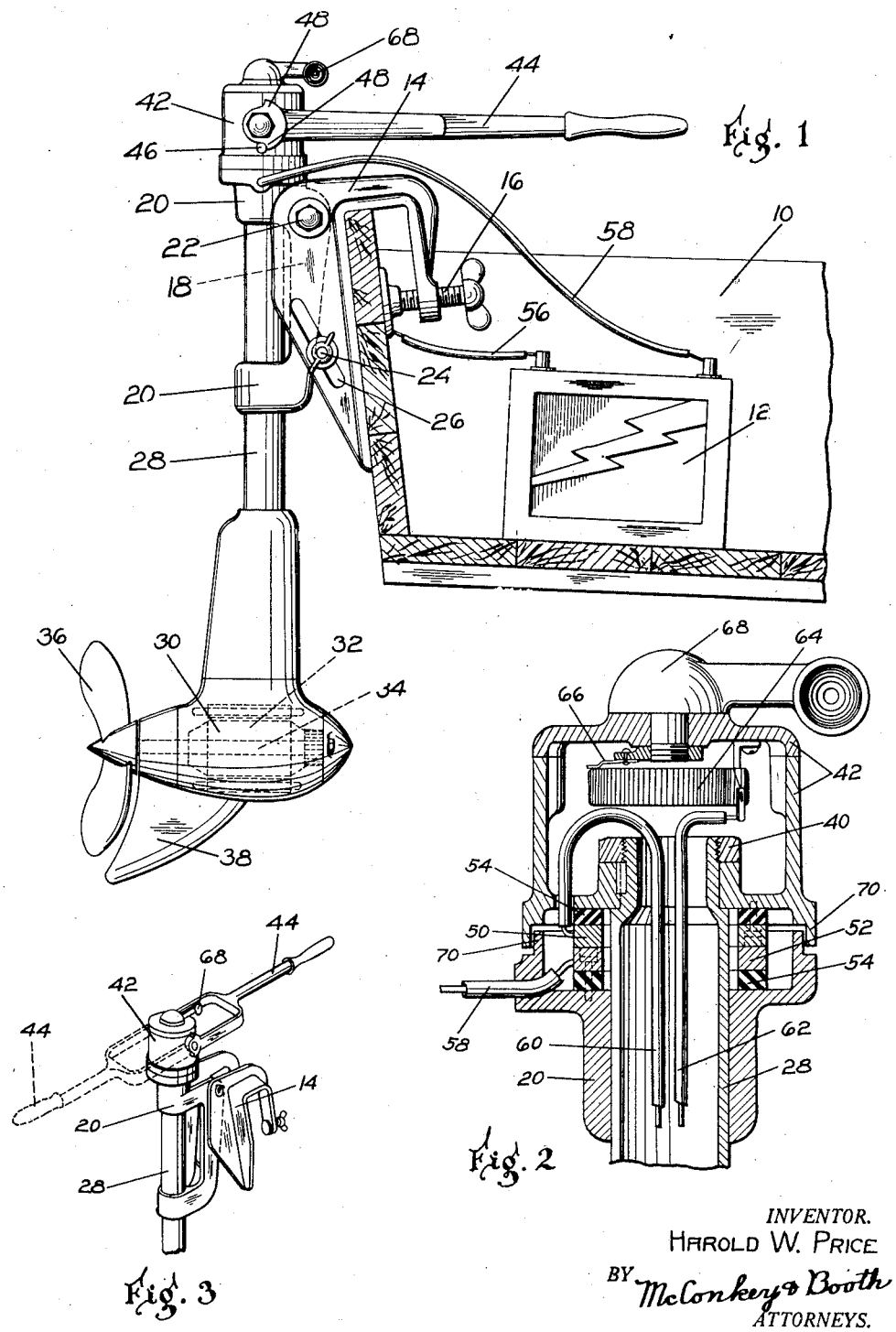
INVENTOR.
HAROLD W. PRICE
BY McConkey & Booth
ATTORNEYS.

Patented May 11, 1937

2,079,871

UNITED STATES PATENT OFFICE 2,079,871

OUTBOARD MOTOR

Harold W. Price, South Bend, Ind.

Application July 3, 1935, Serial No. 29,631

7 Claims. (Cl. 115—18)

This invention relates to outboard motors, and is illustrated as embodied in an electrically driven outboard motor suitable for driving a small boat a considerable distance at a moderate rate of speed on power derived from a storage battery or the like.

An object of the invention is to provide a practical and rugged assembly having no gearing or other mechanical driving connections, the motor being below the waterline (where it will be most effectively cooled) and directly driving the propeller, and being sealed in a water-tight housing forming the lower portion of a swiveled vertical casing.

The upper portion of the casing, shown as a generally vertical section of seamless tubing, is swiveled in a bracket adapted to be secured to the boat and which is preferably angularly adjustable. I prefer to provide a handle for the swiveled casing which can be swung to either of two diametrically-opposite positions, for steering the boat either forward or backward.

One feature of the invention relates to providing the upper end of the swiveled casing with a conducting member such as a metal ring, and preferably also with a rheostat or other control device, with connections therefrom extending downwardly through said casing to the motor, and providing the bracket with a conducting member such as a second ring in engagement with the first conducting member in all angular positions of the casing. The battery or its equivalent is then connected to the second conducting member.

The battery-motor circuit may conveniently be completed by grounding both the battery and the rheostat; the battery for example being grounded to the bracket and the rheostat to a rheostat housing mounted on the upper end of the above-described tube.

The above and other objects and features of the invention, including various novel combinations of parts and desirable particular constructions, will be apparent from the following description of the illustrative embodiment shown in the accompanying drawing, in which:

Figure 1 is a longitudinal section through the rear end of a boat, with one embodiment of my invention attached thereto and shown in side elevation;

Figure 2 is a partial vertical section through the upper end of my novel outboard motor; and Figure 3 is a perspective view of the upper end thereof, illustrating the two positions of the steering handle.

My novel outboard motor is illustrated in Figure 1 as mounted on the stern of a boat 10, with a storage battery 12 as a source of electrical energy. It is shown as provided with an adjustable two-part supporting bracket including a clamp part 14 adapted to engage the outside of the stern of the boat and to be secured thereto by one or more threaded clamps 16 adapted to engage the inside of the stern of the boat.

The second part 18 of the bracket has spaced alined vertical bearings 20, and is mounted on the clamp part 14 by means such as a pivot 22. The part 18 of the bracket may be secured in any desired position of angular adjustment by means such as a suitable clamp bolt 24 of any desired character, in a slot 26.

Swiveled in the vertical bearings 20 is a casing comprising, in the embodiment illustrated, a section 28 of seamless tubing having secured (by a water-tight joint) to its lower end below the water-line a stream-lined housing 30 containing an electric motor 32, the armature shaft 34 of which extends rearwardly out through a suitable packed water-tight bearing and has a propeller 36 directly mounted thereon. The housing 30 preferably has secured thereto a rudder 38 below the propeller 36.

It will be noted that putting the motor at the lower end of the vertical casing 28—30, in the described manner, not only eliminates all drive gearing and other connections, but also very effectively cools the motor.

The upper end of the tube 28 is shown as having secured thereto, for example by a nut 40, a control box 42 (shown adapted to be made in two pieces fastened together by screws or other fastening means). The control box is keyed to the end of the tube 28 (which may be regarded as a hollow shaft mounted in the bearings 20). It is provided with a steering handle 44, preferably pivoted thereto so that it may be swung as shown in Figure 3 from one to the other of two diametrically-opposite positions, determined by a stop 46 engaging shoulders 48 on the handle, for steering the boat either forward or backward.

The weight of the vertical casing 28—30—42 is shown taken by the upper bearing 20, through the medium of two conducting members such as rings or brushes 50 and 52, carried by but insulated (by washers or the like 54 of insulating material) from the control box 42 and the bearing 20 respectively.

These conducting members are held, by the weight of the swiveled parts, in close conducting engagement in all angular positions of the swiveled parts. The conducting parts and their insulating rings 54 may be secured to the control box 42 and the bearing 20 by means such as screws or other fastenings of insulating material, or which are insulated by bushings or the like from the rings 50 and 52, or in any other desired manner.

One side of the battery 12 is shown grounded, by means such as a lead 56, to the bracket member 16 or 14; the other side is connected by a lead 58 to the conducting member 52. The conducting member 50 has a lead 60 extending down through the tube 28 to the motor.

The other connection 62 from the motor comes up through the tube 28 and is connected to a control such as a resistance coil 64 mounted in the control box 42, and forming part of a rheostat having a slide 66 operated by a handle 68 outside the control box 42, the slide 66 of course thereby being grounded to the control box 42.

The control box 42 and the upper bearing 20 are preferably provided with interfitting flanges 70 forming a substantially closed annular space for the rings 50 and 52.

While one illustrative embodiment has been described in detail, it is not my intention to limit the scope of my invention to that particular embodiment, or otherwise than by the terms of the appended claims.

I claim:

1. An outboard motor comprising a vertically-arranged casing having a support adapted to be detachably secured to a boat and arranged to be swiveled relatively to said support to steer the boat, an electric motor in a water-tight housing secured to the lower end of said casing and having its armature shaft extending rearwardly through the housing and having a propeller directly mounted thereon, a control device at the upper end of the casing having electrical connections extending downwardly through the casing to said motor, and electrical connections to said control device including slidably engaging parts carried respectively by the casing and said support in such a manner as to remain in electrical contact when the casing is swiveled on the support, and said casing and support being formed to provide an inclosed space housing said parts well above the water line.

2. An outboard motor comprising a vertically-arranged casing adapted to be detachably mounted on a boat and arranged to be swiveled to steer the boat, an electric motor in a water-tight housing secured to the lower end of said casing and having its armature shaft extending rearwardly through the housing and having a propeller directly mounted thereon, and a control device at the upper end of the casing having electrical connections extending downwardly through the casing to said motor, in combination with a fixed bracket in which said casing is swiveled, said casing and said bracket having insulated therefrom a pair of conducting members in contact with each other in all angular positions of the casing, means for connecting the member carried by the casing in the motor circuit inside the casing, and means for connecting the member on the bracket to a source of electrical energy outside the casing.

3. An outboard motor comprising a vertically-arranged casing adapted to be detachably mounted on a boat and arranged to be swiveled to steer the boat, an electric motor in a water-tight housing secured to the lower end of said casing and having its armature shaft extending rearwardly through the housing and having a propeller directly mounted thereon, a rheostat inside the upper end of the casing having electrical connections extending downwardly through the casing to said motor, and means outside said casing and mounted at the upper end thereof to operate said rheostat, in combination with a fixed bracket in which said casing is swiveled, said casing and said bracket having insulated therefrom a pair of conducting members in contact with each other in all angular positions of the casing, means for connecting the member carried by the casing in the motor circuit inside the casing, and means for connecting the member on the bracket to a source of electrical energy outside the casing.

4. An outboard motor comprising a generally vertical tube having an electrical control mounted on its upper end and having a conducting member mounted thereon and insulated therefrom and which is connected to said control, and to electrical connections extending downwardly through said tube, a bracket in which said tube is swiveled and which has mounted thereon and insulated therefrom a conducting member engaging the first member in all angular positions thereof and which is adapted to be connected to a source of electrical energy, a watertight housing secured by a watertight joint to the lower end of the tube and containing an electric motor connected to said connections and having a shaft extending outside the housing, and a propeller operated by said shaft.

5. An outboard motor comprising a generally vertical tube having an electrical control mounted on its upper end and grounded thereto and having a conducting member mounted thereon and insulated therefrom and which is connected to said control, electrical connections from said member and said control respectively extending downwardly through said tube, a bracket in which said tube is swiveled and which has mounted thereon and insulated therefrom a conducting member engaging the first member in all angular positions thereof, a source of electrical energy grounded to said bracket and connected to said conducting member on the bracket, a watertight housing secured by a watertight joint to the lower end of the tube and containing an electric motor connected to said connections and having a shaft extending outside the housing, and a propeller operated by said shaft.

6. An outboard motor comprising a generally vertical tube having an electrical control mounted on its upper end and having a conducting member mounted thereon and insulated therefrom and which is connected to said control, and to electrical connections extending downwardly through said tube, a bracket in which said tube is swiveled and which has mounted thereon and insulated therefrom a conducting member engaging the first member in all angular positions thereof and which is adapted to be connected to a source of electrical energy, a watertight housing secured by a watertight joint to the lower end of the tube and containing an electric motor connected to said connections and having a shaft extending outside the housing, and a propeller operated by said shaft, said housing being of streamlined form and having a rudder below the propeller.

7. An outboard motor comprising a generally vertical tube having an electrical control mounted on its upper end and having a conducting member mounted thereon and insulated therefrom and which is connected to said control and to electrical connections extending downwardly through said tube, a bracket in which said tube is swiveled and which has mounted thereon and insulated therefrom a conducting member engaging the first member in all angular positions thereof and which is adapted to be connected to a source of electrical energy, a watertight housing secured by a watertight joint to the lower end of the tube and containing an electric motor connected to said connections and having a shaft extending outside the housing, and a propeller operated by said shaft, the weight of the swiveled parts being taken by said conducting members, which are thereby held in intimate electrical contact.

HAROLD W. PRICE.